US008957766B2

(12) United States Patent
Tsui et al.

(10) Patent No.: US 8,957,766 B2
(45) Date of Patent: Feb. 17, 2015

(54) UNIVERSAL TRANSMITTER

(76) Inventors: Gallen Ka Leung Tsui, Brampton (CA); Philip Y. W. Tsui, Brampton (CA)

( * ) Notice: Subject to any disclaimer, the term of this patent is extended or adjusted under 35 U.S.C. 154(b) by 919 days.

(21) Appl. No.: 12/536,827

(22) Filed: Aug. 6, 2009

(65) Prior Publication Data

US 2011/0032116 A1 Feb. 10, 2011

(51) Int. Cl.

| | |
|---|---|
| ***H04B 1/26*** | (2006.01) |
| ***H04B 1/06*** | (2006.01) |
| ***H01H 19/00*** | (2006.01) |
| ***H01H 3/16*** | (2006.01) |
| ***H04B 1/00*** | (2006.01) |
| ***G08C 19/12*** | (2006.01) |
| ***G08C 19/16*** | (2006.01) |
| ***G08B 21/00*** | (2006.01) |
| ***G08C 17/00*** | (2006.01) |

(52) U.S. Cl.

CPC ............ *G08C 17/00* (2013.01); *G08C 2201/20* (2013.01); *G08C 2201/92* (2013.01)

USPC ..... 340/13.2; 340/5.71; 340/12.1; 340/12.28; 340/540; 455/199; 455/345; 200/19.07; 200/19.18; 200/79

(58) Field of Classification Search

USPC ................ 340/5.71, 10.1, 12.1, 12.15, 12.28, 340/12.5, 12.53, 426.28, 426.36, 540; 455/199, 345

See application file for complete search history.

(56) References Cited

U.S. PATENT DOCUMENTS

| | | | | |
|---|---|---|---|---|
| 4,082,369 | A * | 4/1978 | Black et al. | 303/3 |
| 4,731,605 | A * | 3/1988 | Nixon | 341/176 |
| 4,750,118 | A * | 6/1988 | Heitschel et al. | 700/90 |
| 6,377,173 | B1 * | 4/2002 | Desai | 340/426.36 |
| 6,549,754 | B1 * | 4/2003 | Miller et al. | 455/3.02 |
| 6,803,851 | B1 * | 10/2004 | Kramer et al. | 340/5.61 |
| 7,215,238 | B2 * | 5/2007 | Buck et al. | 340/5.23 |
| 7,376,401 | B2 * | 5/2008 | Maurer | 455/130 |
| 7,659,833 | B2 * | 2/2010 | Warner et al. | 340/12.5 |
| 7,675,430 | B2 * | 3/2010 | Warner et al. | 340/12.5 |
| 2004/0207537 | A1 * | 10/2004 | Keller et al. | 340/825.72 |
| 2009/0303013 | A1 * | 12/2009 | Edgerton | 340/10.1 |
| 2010/0109558 | A1 * | 5/2010 | Chew | 315/294 |

* cited by examiner

*Primary Examiner* — George Bugg
*Assistant Examiner* — Renee Dorsey

(57) ABSTRACT

An apparatus and methods are provided for a universal transmitter. In one embodiment, a method includes detecting activation of at least one button of the universal transmitter, by a controller, for a predetermined time, outputting at least one set of signals to a first set of terminals of a switch of the universal transmitter, detecting output on a second set of terminals of the switch and determining position of a switch, by the controller, based, at least in part, on the output detected on the second set of terminals, wherein position of the switch relates to a transmission type. The method can further include detecting activation of a first button to be programmed and programming the first button based on the transmission type.

23 Claims, 7 Drawing Sheets

UNIVERSAL TRANSMITTER

FIELD OF THE INVENTION

The invention relates in general to a transmitter for controlling activation of a barrier operator and, in particular, to a programmable transmitter.

BACKGROUND

The radio transmitter has been a critical element for barrier operators, such as garage door openers (GDO). A universal transmitter is a radio transmitter that can transmit one or more radio control signals to actuate a barrier operator. A major advantage of universal transmitters is the ability to be programmed for operation of different brands of GDO. This allows retailers to offer one product which may be suitable for many customers. Many of the currently offered garage door openers operate at different frequencies and different wireless signal protocols. Thus, users are required to setup the universal transmitter according to the brand of the garage door opener. Although, universal transmitters for garage door openers (GDO) have been on the market for a long time, many of the conventional programming techniques are difficult for users to perform. Additionally, the configurations of conventional universal transmitters do not allow for programming to be simplified.

Setup of a conventional transmitter typically requires setup of at least two variables, 1) brand of the GDO, and 2) operating frequency of the GDO. In certain circumstances the user may also be required to set additional switches and perform additional tasks for programming of the transmitter. Programming of conventional transmitters may require many steps. Further, a user is typically required to repeat the steps to program the transmitter for more than one GDO. Because there may be multiple settings that the user has to program, it is important that programming of a transmitter should be simplified. Otherwise, the user will not be able to properly program a universal transmitter to operate a GDO.

Because many of the offered universal transmitters can change a transmission frequency, a manual switch or a relay may typically be used. A manual switch, however, would require a user to change the setting and as a result is not convenient. Use of a relay would be prohibited as, the size of the transmitter will be too large as there could be multiple frequencies, up to 10 frequencies and each frequency requires one relay. Therefore, both approaches of having a manual switch and a relay are not feasible. Thus, one approach presented by the present disclosure is directed to automatic switching of a transmission frequency.

Universal transmitters can be configured to use an identification code which is often not changeable. Because a limited number of codes are generated, manufacturers may repeat codes previously used. As a result, it may bee possible for users of GDO to operate devices that are not their own. It is desired to allow the user to change the identity code for a transmitter with factory pre-programmed identity code and the way of changing this code would require the microprocessor to generate a different identity code.

Although there are many universal transmitters currently offered, these products do not meet the needs of many consumers. Accordingly, what is needed is a system and method which overcomes one or more of the aforementioned drawbacks.

BRIEF SUMMARY OF THE INVENTION

Disclosed and claimed herein are an apparatus and methods for a universal transmitter. In one embodiment, a method includes for operation of the universal transmitter includes detecting activation of at least one button of the universal transmitter, by a controller, for a predetermined time, outputting at least one set of signals to a first set of terminals of a switch of the universal transmitter, detecting output on a second set of terminals of the switch and determining position of a switch, by the controller, based, at least in part, on the output detected on the second set of terminals, wherein position of the switch relates to a transmission type. The method may further include detecting activation of a first button to be programmed and programming the first button based on the transmission type.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

According to one aspect of the invention, the present disclosure is directed to a transmitter which may be programmed to activate one or more movable barriers such as a garage door opener. In one embodiment, a universal transmitter is provided which includes one or more buttons which may be programmed to transmit an activation signal based on at least one of manufacturer, or brand, of a GDO, transmission frequency and transmitter identity. The transmitter may include a rotary switch that a user may employ to enter one or more desired settings for transmission.

According to one embodiment, a novel switch circuit is provided which minimizes the pins required of a controller for operating the transmitter. The switching circuit may allow for a user to program at least brand and transmission frequency for the transmitter employing a single selection switch. Additionally, the switch arrangement may simplify programming of the transmitter.

According to another embodiment of the invention, a process is provided for detecting one or more user settings by a controller of the universal transmitter. The process may minimize the programming required by a user for operation of the universal transmitter with one or more existing GDOs.

As used herein, the terms “a” or “an” shall mean one or more than one. The term “plurality” shall mean two or more than two. The term “another” is defined as a second or more. The terms “including” and/or “having” are open ended (e.g., comprising). The term “or” as used herein is to be interpreted as inclusive or meaning any one or any combination. Therefore, “A, B or C” means “any of the following: A; B; C; A and B; A and C; B and C; A, B and C”. An exception to this definition will occur only when a combination of elements, functions, steps or acts are in some way inherently mutually exclusive.

Reference throughout this document to “one embodiment,” “certain embodiments,” “an embodiment,” or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

Figure 1B:
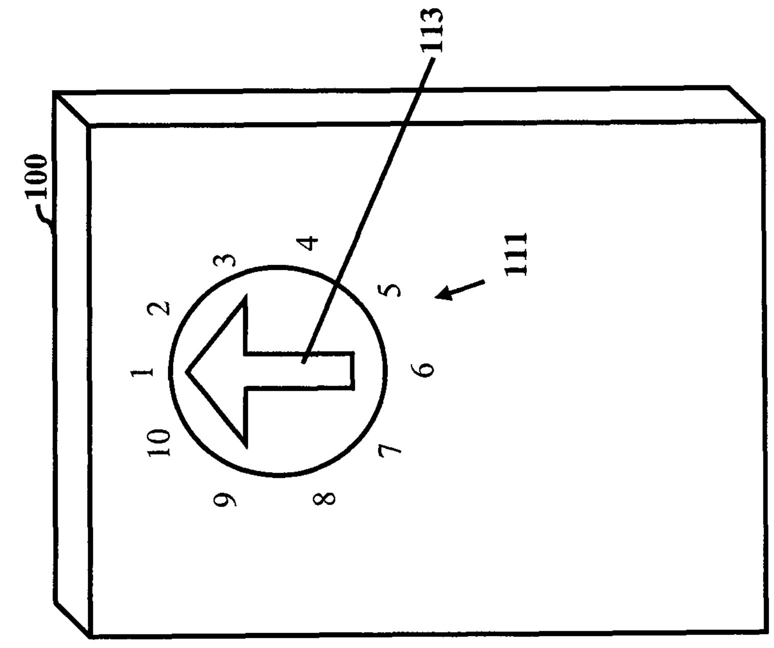
FIGS. 1A-1B depict graphical representations of a universal transmitter according to one or more embodiments of the invention.
Figure 1A:
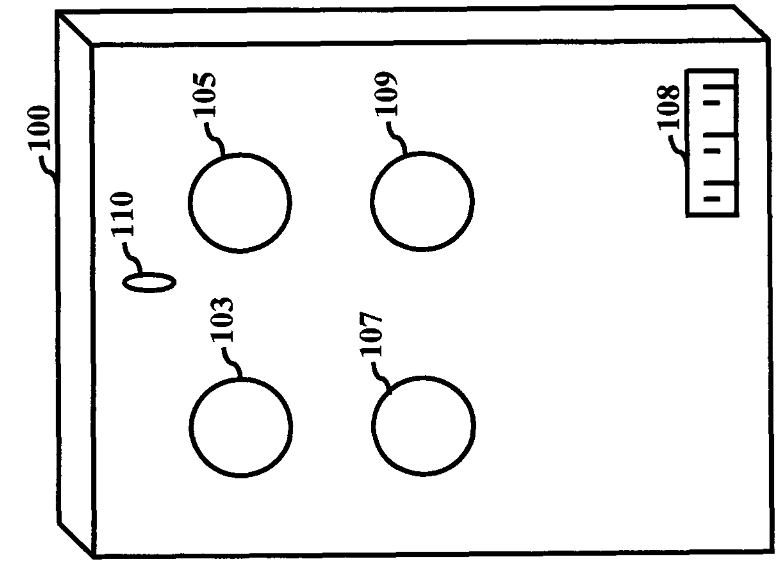

Referring now to the figures, FIGS. 1A-1B depict graphical representations of a universal transmitter according to one or more embodiments of the invention. Referring first to FIG. 1A, a frontal view is shown of transmitter 100 according to one embodiment. Transmitter 100 includes buttons 103, 105, 107, and 109 which may be employed by a user to output a barrier control signal. In one embodiment, each button may be programmed to transmit activation programmed according to at least one of a brand/manufacturer and transmission frequency to operate a specific garage door opener (GDO).

Transmitter 100 includes LED 110 which may be configured to indicate transmission of an activation signal and/or indication of a setup/programming procedure for the transmitter. Transmitter 100 may optionally include DIP switch 108 to provide a changeable identity code for transmitter 100. DIP switch settings may be detected by a controller of transmitter 100 as will be described in further details below with reference to FIG. 3A. In another embodiment, a controller of transmitter 100 may randomly generate a new identity code, or employ an identity codes stored in memory.

FIG. 1B, depicts a back side of transmitter 100. According to one embodiment, transmitter 100 may include switch 111 for programming and/or setup of the transmitter. As shown in FIG. 1B, switch 111 includes ten different positions which can relate to ten different brands and/or transmission frequencies that a user can select. In one embodiment, switch 111 relates to a rotary switch may be rotated to select a desired position. Dial 113 of switch 111 may be positioned to indicate one of the ten positions (shown as positions 1-10). Table 1 shows switch setting for various brands according to one embodiment of the invention.

TABLE 1

| Location | Brand |
|---|---|
| 1 | Chamberlain |
| 2 | Genie |
| 3 | Overhead Door |
| 4 | Skylink |
| 5 | Sears |
| 6 | Wayne Dalton |
| 7 | Linear |
| 8 | Stanley |
| 9 | Moore-O-Matic |
| 10 | Pulsar |

Figure 2:
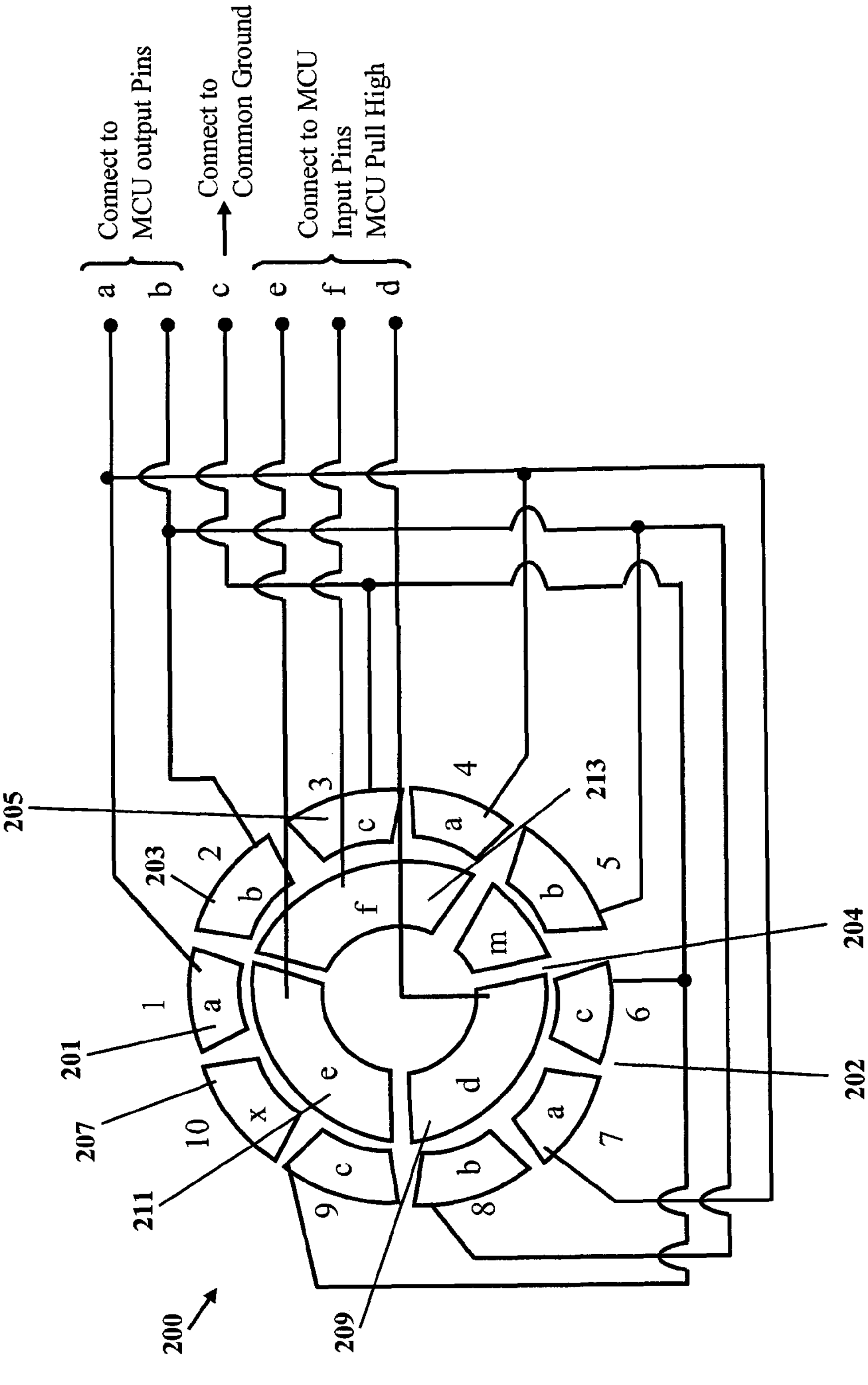
FIG. 2 depicts a graphical representation of a rotary switch configuration according to one or more embodiments of the invention.

Referring now to FIG. 2, a simplified diagram is depicted of a switch configuration for the switch of FIG. 1, according to one embodiment of the invention. One advantage of the present disclosure may be to provide a configuration may be to reduce the number of pins required for switch 200. For example, a typical connection for a rotary switch with ten positions would require at least ten input pins for a microprocessor, as each position may act as single switch. However, employing a microprocessor with sufficient input pins may be cost prohibited. Accordingly, the present disclosure is directed to a configuration which provides for ten selections and requires only five controller pins.

As shown in FIG. 2, switch 200 comprises outer ring 202 having input pins and inner ring 204 having output pins according to one embodiment. Outer ring 202 includes ten positions and three sets of terminal pins, “a” terminals 201, “b” terminals 203 and ‘c’ terminals 205. Outer ring 202 additionally contains a tenth terminal, “x” pin 207. Pin 207 may be employed to detect settings of a DIP switch (e.g., DIP switch 108) by a controller of the transmitter. Inner ring 204 of switch 200 includes “d” terminals 209, “e” terminals 211, “f” terminals 213 and a position marker (shown as “m”).

Input terminals 201 and 203 may be coupled to receive output signals from a controller of the transmitter. Terminals 205 may be coupled to common ground terminal according to one embodiment. A controller of the transmitter can generate one or more different signals (e.g., output states, such as logical high or low) on terminals 201 and 203, and then evaluate the output signals of the inner circle at terminals 209, 211, 213. As such, the configuration requires two output pins and three input pins of the controller, requiring five total pins. Based on the output signals, the controller can determine the location of the switch as will be discussed in more detail below with reference to FIG. 3.

As further shown in FIG. 2, switch 200 is selecting position “5” as marker “m” is aligned with terminal “5”. In one embodiment, inner ring 202 may be configured to rotate for positioning of the selector switch with one terminal. According to another embodiment, outer ring 202 may be configured to rotate in relation to a fixed inner ring 204. By selecting a terminal of switch 200, the user may select a particular type of transmission required by a particular manufacturer as described in Table 1. In one embodiment, terminals 209, 211, 213 of inner ring 204 will be in contact with one terminal of outer ring 202. According to another embodiment, terminals 209, 211, 213 of inner ring 204 may contact one or more terminal pins of outer ring 202.

According to another embodiment, switch 200 may be employed to program additional variables for the transmitter of FIG. 1. In addition to programming the brand of the garage door opener, switch 200 may be employed to select one or more transmission frequencies to accommodate one or more GDO brands. Programming the transmission frequency may be important as there are many possible frequencies for different brands of GDO. Table 2 lists exemplary frequencies for operating different GDOs.

TABLE 2

| Rotary Switch Location | Frequency (MHz) |
|---|---|
| 1 | 300 |
| 2 | 303 |
| 3 | 305 |
| 4 | 307 |
| 5 | 310 |
| 6 | 312 |
| 7 | 315 |
| 8 | 318 |
| 9 | 372 |
| 10 | 390 |

One advantage of employing switch 200 for selection of frequency may be that additional terminals of a controller are not required. In that fashion, switch 200 may be provided which minimizes resources of the microprocessor is desired. According to one embodiment, a programming process may be provided for a user wherein the user may first use the rotary switch 200 to select the brand (e.g., one brand out of ten possible settings), then use same rotary switch 200 to select the frequency (e.g., one frequency out of ten possible frequencies). It should also be appreciated that the transmitter of FIG. 1 may include a dedicated switch for frequency selection in addition to rotary switch 200 for selection of a GDO brand according to another embodiment. Although the present disclosure discusses the use of a rotary switch 200, it should also be appreciated that other types of switches, such as a slide switch, capacitive switch, etc., may be employed by the universal transmitter to receive a user selection.

Figure 3B:
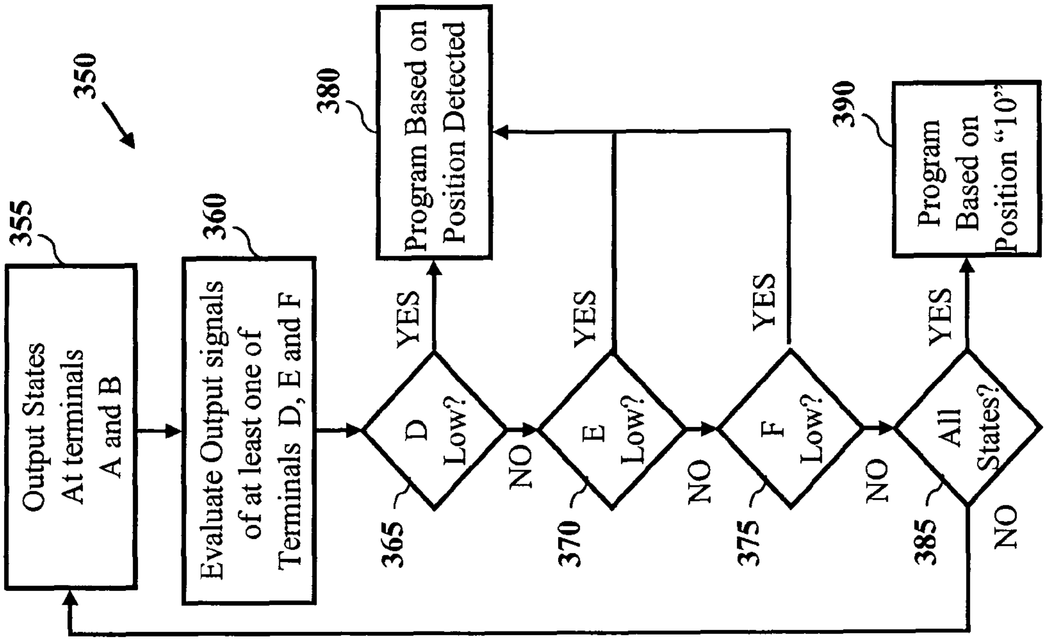
FIGS. 3A-3B depict processes for determining a position of a rotary switch according to one embodiment of the invention.
Figure 3A:
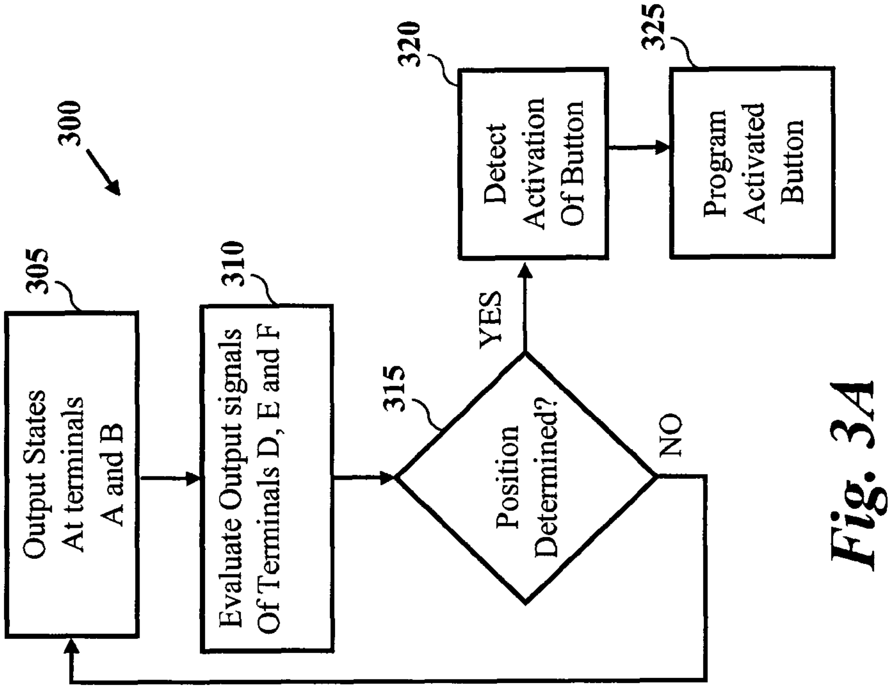

Referring now to FIGS. 3A-3B, processes are shown for determining the position of a switch according to one or more embodiments of the invention. Referring first to FIG. 3A, a process is depicted for determining a position of the switch of FIG. 2 by a transmitter according to one embodiment. As will be discussed in more detail below with reference to FIG. 8, a controller of the transmitter may be configured to program the transmitter based on a user selection of switch 200. Process 300 may be initiated following detection, by a controller, that a user has activated one or more buttons (e.g., buttons 103, 105, 107, 109) of transmitter (transmitter 100) for a predetermined time. In response, the controller can output signals to A and B terminals 201 and 203 to determine the position of the rotary switch (e.g., switch 200) at block 305. The controller may then evaluate output signals at one or more of terminals 209, 211, and 213 at block 310. Table 3 lists exemplary output signals and exemplary signal levels that may be received by the controller according to one embodiment. By way of example, the controller may output logical high (1) and/or logical low (0) values to A and B terminals 201 and 203. Based on the position of the rotary switch 200, controller terminals of outer ring 204 will output particular values. In certain embodiments, the determining the position of the rotary switch may require outputting a second and/or third set of signals to pin terminal pins A and B.

TABLE 3

| | INPUT | | | | | | | | |
|---|---|---|---|---|---|---|---|---|---|
| | A High (1), B High (1) | | | A High (1), B Low (0) | | | A low (0) B High (1) | | |
| Terminal | D | E | F | D | E | F | D | E | F |
| 1 | 0 | 0 | 0 | 0 | 0 | 0 | 0 | 0 | 0 |
| 2 | X | 1 | 1 | X | 1 | 1 | X | 0 | 0 |
| 3 | 1 | 1 | 1 | 1 | 0 | 0 | 0 | 1 | 1 |
| 4 | 1 | 0 | 0 | 0 | 0 | 0 | 1 | 0 | 0 |
| 5 | 0 | X | 1 | 0 | 0 | 0 | 0 | X | 0 |
| 6 | 1 | 1 | 1 | 0 | 0 | 0 | 0 | 0 | 1 |
| 7 | 0 | 1 | 1 | 0 | 0 | 0 | 0 | 1 | 1 |
| 8 | X | 0 | 0 | X | 0 | 0 | X | 0 | 0 |
| 9 | 1 | 1 | 1 | 1 | 1 | 1 | 0 | 0 | 0 |

At decision block 315, the controller may determine if the position of the switch is determined based on detected signals. When the position is not determined ("NO" path out of decision block 315), the controller may apply a second set of output values to terminal pins 201 and 203. In one embodiment, the controller may first output logical high values to terminal pins A and B. The controller may then output a logical high on terminal pin A and a logical low on terminal pin B and evaluate output signals on terminals 209, 211, and 213.

When the controller determines the position ("YES" path out of Decision block 315, the controller can detect a button at block 320 that is pushed by a user for programming the transmission characteristics indicated by the terminal selected by the rotary switch. In one embodiment, the transmitter may indicate detecting of the switch position by one or more flashes on an LED (e.g., LED 110) of the transmitter. The controller may then program the button activated by the user at block 330.

FIG. 3B, depicts a process for determining rotary position of the switch according to one embodiment of the invention. The configuration of switch 200 may allow for determining the position of the switch when one or more of output terminals 209, 211, and 213 are determined to be in a low state. Process 350 may be initiated following detection, by a controller, that a user has activated a button of the transmitter (e.g., transmitter 100) for a predetermined time. In response, the controller can output signals to terminals 201 and 203 at block 355. The controller may then evaluate output of one or more of terminals 209, 211, and 213 at block 360. Process 350 may proceed to determine if terminal 209 is in a low state at decision block 365. When D terminal 209 is low ("YES" path out of decision block 365), the controller can program a terminal based on the determined user selection at block 380. When the D terminal 209 is not low ("NO" path out of decision block 365), the controller can determine if E terminal 211 is low at decision block 370. When E terminal 211 is low ("YES" path out of decision block 370), the controller can program a terminal based on the determined user selection at block 380. When E terminal 211 is not low ("NO" path out of decision block 370), the controller can determine if F terminal 213 is low at decision block 375. When F terminal 213 is low ("YES" path out of decision block 375), the controller can program a terminal based on the determined user selection at block 380. When the F terminal 213 is not low ("NO" path out of decision block 375), the controller can output a different signals to A and B terminals 201 and 203 at block 355.

Process 350 may continue with determination if all output starts have been output at decision block 385. When all combinations have not been output ("NO" path out of decision block 385), the controller may output more states at block 355. When all combinations have been output ("YES" path out of decision block 385), the controller may determine that the switch is location at position ten "10." According to one embodiment, when positions 1-9 are not determined based on the combinations of Table 2, the controller can determined that the switch is located at position "10" at block 390.

According to another aspect of the invention, a programming procedure is provided which simplifies programming of a GDO transmitter. In comparison to conventional programming methods, a process according to the invention allows for one or more programming steps to be performed simultaneously. Another advantage of the invention is that programming of a transmitter of FIG. 1 may allow for simple setup by minimizing the steps required to program the transmitter.

A typical setup procedure for programming a GDO transmitter can require at least five distinct programming steps, and typically requires that each of the steps are performed separately. For example, programming a transmitter with a GDO by a user may require 1) initiating a programming mode, 2) selecting the button to program, 3) selecting the brand that the transmitter is to be programmed for, 4) selecting the frequency for transmission, and 5) defining an identity of the transmitter. The present invention, however, can reduce the steps required for a user to program the transmitter.

Figure 4:
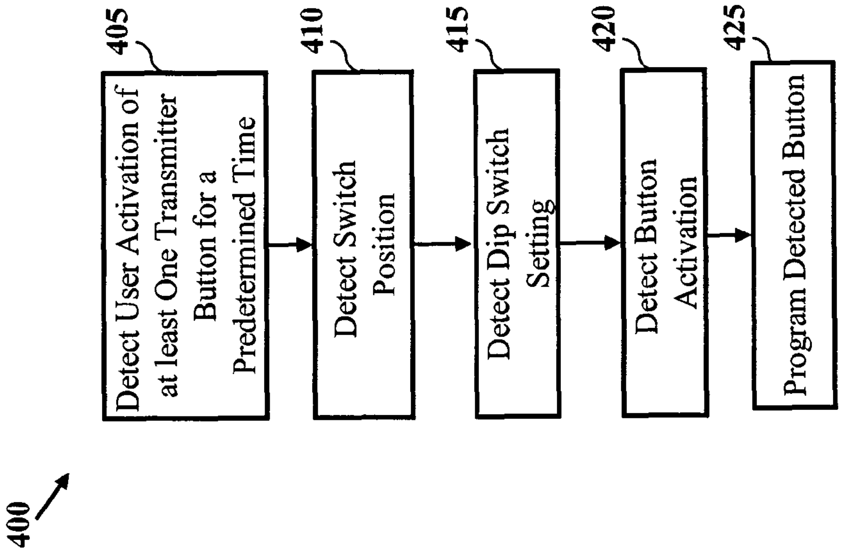
FIG. 4 depicts a process for programming a transmitter according to one or more embodiments of the invention.

Referring now to FIG. 4, a programming process is depicted which may simplify programming of a GDO transmitter according to one or more embodiments of the invention. Process 400 may be performed by a controller of the transmitter and may be initiated by a user depressing at least one button (e.g., button 103) of the transmitter for a predetermined period of time (e.g., 3 seconds). In one embodiment, the programming of the transmitter may be initiated by user activation of two particular buttons, for example buttons 103 and 105. According to one embodiment, the user may place a selection switch (e.g., rotary switch 200) in a desired position to select a brand of GDO manufacturer and/r transmission frequency for an activation signal. In certain embodiments, selection of a brand may be associated with selection of transmission characteristics, including transmission frequency to operate a movable barrier. The user may additionally set a DIP switch prior to activation of the transmitter button(s) for programming of the transmitter. Following detection of the transmitter buttons at block 405, the controller may initiate a programming mode by detecting the position of the switch at block 410 and detecting DIP switch settings at block 415. Thus, the controller may perform three programming steps in one according to one embodiment. The controller may then detect activation of a button of the transmitter at block 420.

Based on the button detected, the controller can program the transmitter at block 425 for transmission of an activation signal according to one or more of the settings detect during process 400. By way of example, the controller may program the transmitter based on a brand selected and/or frequency selected. According to another embodiment, process 400 may additionally include one or more acts for detection of a transmission frequency selected by a user in addition to a brand of GDO manufacturer as will be described in more detail below with respect to FIG. 5.

Figure 5:
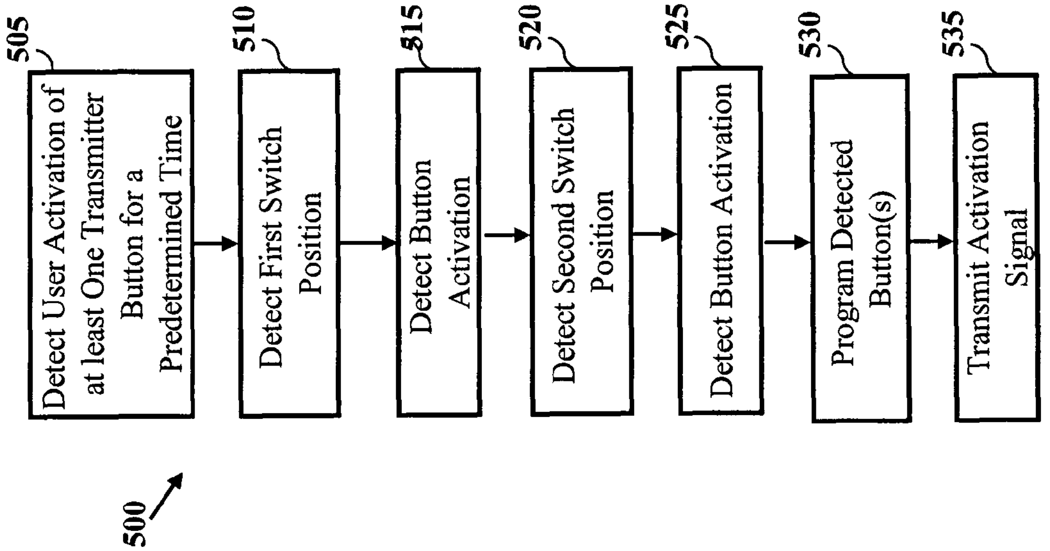
FIG. 5 depicts a process for programming a transmitter according to one or more embodiments of the invention.

Referring now to FIG. 5 a process is depicted for programming the transmitter of FIG. 1 according to one or more embodiments. A user may select a brand for programming a transmitter as described above and initiate a programming sequence by activating at least one button of the transmitter for a predetermined period of time. A controller of the transmitter may be configured to initiate process 500 based on detection of the button activation at block 505 and detecting the position of a switch (e.g., rotary switch 200) at block 510 for detection for a transmission type such as a GDO brand and/or transmission frequency. However, in certain embodiments, the universal transmitter may be configured to determine a second position of the switch for specification of a desired transmission frequency and/or programming of a second activation button.

According to one embodiment, the controller may then detect a transmission frequency by detecting the position of the switch (e.g., rotary switch 200) a second time at block 520. As shown in FIG. 5, the user may activate a button to be programmed once a programming mode has been initiated. The controller may be configured to output a signal to an indicator (e.g., LED 110). The user may then position the switch to indicate a desired transmission frequency based on the position of the switch. The controller may then program the detected button based on the user selections at blocks 510 and 520. At block 525, the controller may detect activation of a button and may program the button based on the user selections at block 530. Thus, the controller may be configured to transmit an activation signal based on the brand setting, DIP switches setting and the frequency setting a user has programmed.

According to another embodiment, process 500 may relate to a process for selection of one or more transmission frequencies. For example, a user may employ the switch (e.g., rotary switch 200) for selection of a transmission frequency, such as the transmission frequencies of Table 3, wherein a first switch position may be detected by the controller at block 510. The controller may program an activation button based on the transmission frequency selected at block 510 and detection of an activation button at block 515. The user may employ the switch to select second transmission frequency which the controller may detect by determining a second position of the switch at block 520. The controller may detect a second activation button at block 525 to be programmed based on the second transmission frequency selected. At block 530, one or more activation buttons may be programmed. For example, first and second buttons may be programmed based on a user selection of transmission frequencies. Transmission of an activation frequency may be based on controller output to a crystal selection switch as will be described in more detail below with reference to FIG. 6. The controller may transmit an activation signal at block 535 based on transmission frequency selected.

According to another embodiment of the invention, the transmitter may include switching circuitry to automatically select a transmission frequency. One advantage of employing a universal transmitter (e.g., transmitter 100) may be that different frequencies may be programmed for different buttons for the transmitter. Transmitting an activation signal at block 535 may include enabling a frequency selection switch for selection of a frequency based on a frequency selected by a user.

Figure 6:
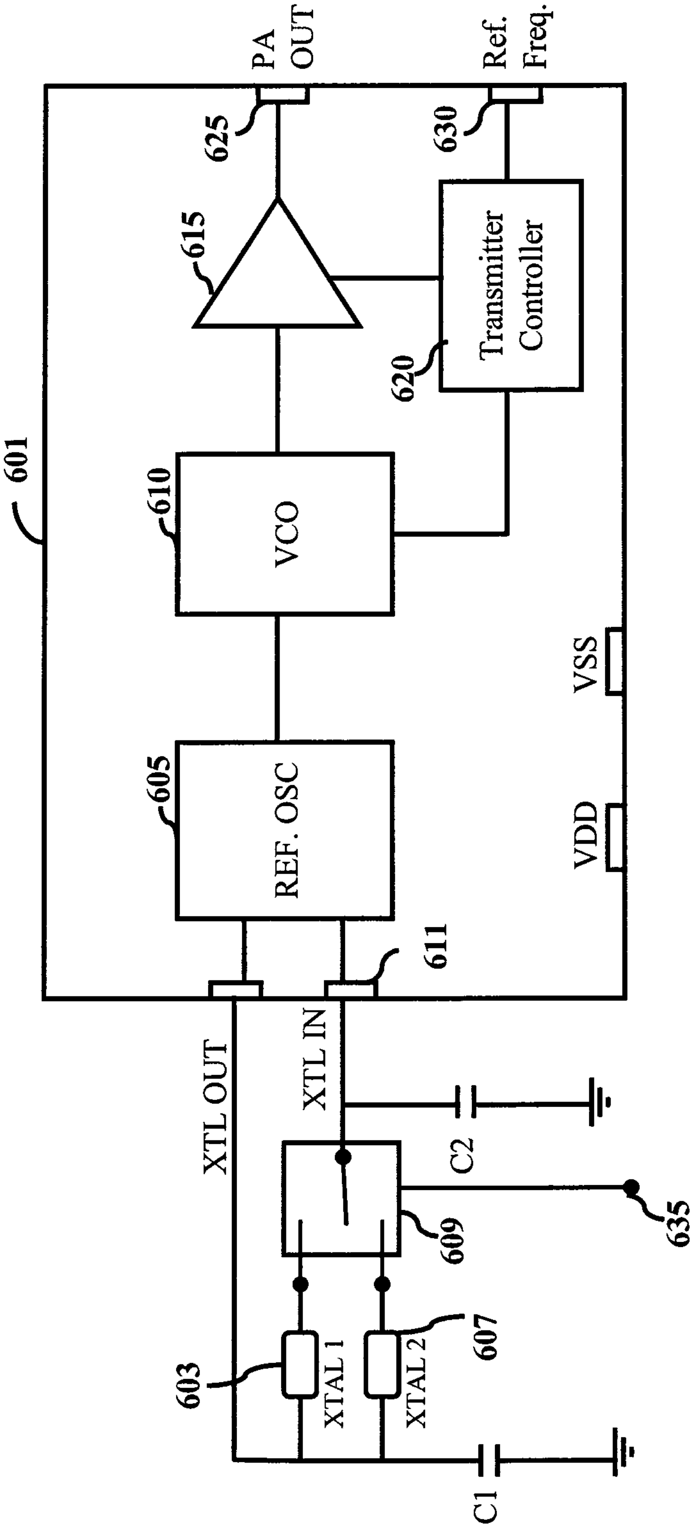
FIG. 6 depicts a simplified block diagram of a transmitter circuit according to one or more embodiments of the invention.

Referring now to FIG. 6, a simplified diagram is depicted of transmitter circuitry according to one or more embodiments of the invention. As shown in FIG. 6, transmitter circuit 601 includes crystal 603, reference oscillator 605 and phase lock loop (PLL)/voltage controlled oscillator circuit (VCO) 610 configured to generate a plurality of transmission frequencies based on a reference frequency. Reference oscillator 605 may output a base frequency which may be employed as a reference frequency to generate a transmission frequency by transmitter circuit 601. According to one embodiment, reference oscillator 605 may oscillate based on a crystal frequency coupled to the oscillator. Transmitter controller 620 may be configured to control amplifier 615 and/or PLL/VOC circuit 610 to output the transmission frequency at terminal 625. According to another embodiment, transmission frequency of an activation signal generated by transmitter circuit 601 may be based, in part, on one or more signals provided output by crystal to reference oscillator 605, such as crystal 607 through a switch 609.

Crystal 603 may be connected to input pin 611 of transmitter circuit 601 to output one or more reference signals. According to one embodiment, transmission frequency of an activation signal generated by transmitter circuit 601 may be based on a reference frequency of the crystal 603. For example, in one embodiment the transmission frequency may be thirty times a reference frequency. Accordingly, in one exemplary embodiment, a reference frequency of 10 MHz by crystal 603 may be employed to generate a transmission frequency of 300 MHz by transmitter circuit 601. In order to generate multiple frequencies, multiple reference frequencies may be required. In contrast to employing a crystal as a reference for each transmitter frequency, transmitter circuit 601 may include switch 609 to select a desired crystal.

According to one embodiment, switch 609 may be controlled based on one or more signals applied to input 635 by a controller of the universal transmitter as will be described in more detail below with reference to FIG. 8. Terminal 630 of transmitter circuit 601 may be coupled to a data modulation output pin of the universal transmitter controller to receive a modulation data signal. Transmitter circuit 601 can may be configured to modulate the received modulation data signal and transmit an activation signal at terminal 625 with a frequency based on the selected crystal (e.g., crystal 603, 607) and the value of the reference oscillator 605.

A controller of the universal transmitter may further be configured to control switch 609 to generate a transmission frequency based on the value provided on terminal 611. In that fashion, switch 609 may be controlled to provide at least two reference values to generate different reference frequencies. It may also be appreciated that transmitter controller 620 may be configured to transmit a coded signal in one or more of On-Off Keying (OOK), Amplitude Shift Keying (ASK) or Frequency Shifted Keying (FSK) to activate a GDO.

Advantages of the switching circuitry of FIG. 6 may include: 1) low turn-on resistance and high turn-off resistance, 2) small turn-off stray capacitance between the input and output pins, and 3) low input and output capacitance. Low turn on resistance and high turn off resistance may be provided by the switching arrangement of transmitter circuit 601 to reduce energy which may be lost on the resistance of the contact during turn-on. Additionally, these values may be used to provide a stable operating environment for reference oscillator 605.

The switching arrangement of transmitter circuit 601 may also provide small turn-off stray capacitance at switch 609, to prevent undesired oscillating of a selected crystal (e.g., crystal 603 and/or 609) based on frequency of the crystal which may pass through a stray capacitance. This may also affect the stability of the other selected crystal oscillation in the same circuitry. Switch 609 may account for low input and output capacitance that can affect the loading capacitor values (e.g., capacitors C1 and C2) of the crystal and the accuracy of the oscillator frequency of the selected crystal.

Figure 7:
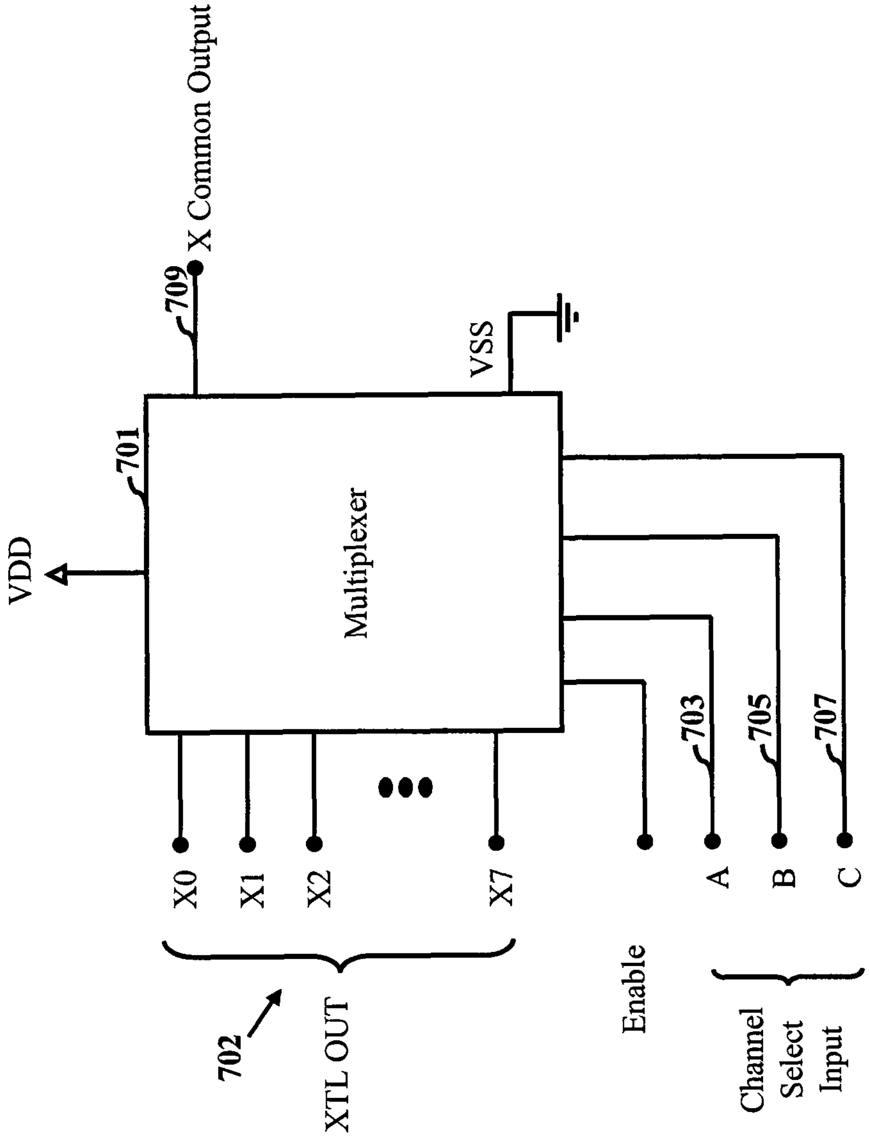
FIG. 7 depicts a multiplexer circuit according to one or more embodiments of the invention.

Referring now to FIG. 7, a switching circuit is depicted according to one embodiment of the invention. Switching circuit 701 may include multiple electronic built-in switches which allow for switching of one or more output frequencies in a compact size, at a low operating voltage and low current consumption. As shown in FIG. 7, switching circuit 701 may be coupled to pins, A, 703, B, 705, C, 707, eight possible selections at analog input pins X0-X7, and output pin 709. Depending on the various high or low states at terminals A and B (e.g. terminal pins 201 and 203), output 709 can output one or the crystal inputs 702 according to Table 4.

TABLE 4

| | Select | | | |
|---|---|---|---|---|
| Enable | A | B | C | ON Channels |
| L | L | L | L | X0 |
| L | L | L | H | X1 |
| L | L | H | L | X2 |
| L | L | H | H | X3 |
| L | H | L | L | X4 |
| L | H | L | H | X5 |
| L | H | H | L | X6 |
| L | H | H | H | X7 |

Figure 8:
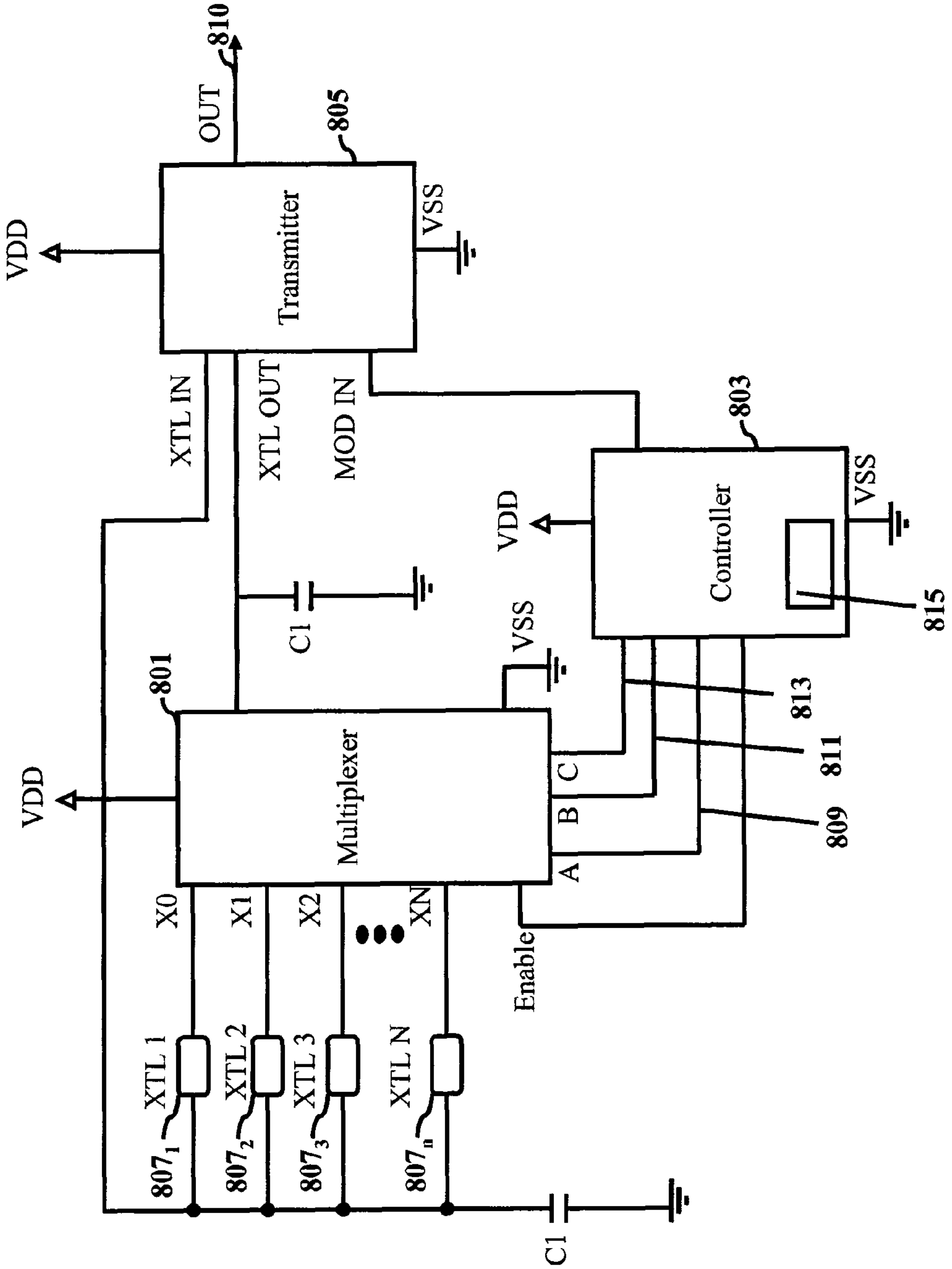
FIG. 8 depicts a simplified block diagram of a transmitter according to one or more embodiments of the invention.

Referring now to FIG. 8, depicted is a simplified circuit diagram which may be employed by a transmitter according to one or more embodiments of the invention. As shown in FIG. 8, switching circuit 801 is coupled to controller 803, transmitter 805 and crystals, X0 to Xn, $807_{1\text{-}n}$. Input pins of the switching circuit 801 include terminal "A" 809, "B" 811, and C 813 are connected to controller 803. Controller 803 may be configured to generate different signals at pins 809, 811 and 813 in order to select a crystal to be used as a reference frequency for the transmitter 805 to generate the actual transmission frequency. Controller 803 may also generate data modulation based on the brand selection and DIP switches detected from a user to generate a transmission signal to operate a GDO. Therefore, when a button (e.g., button 103) is activated on transmitter, it will first read the programmed settings from memory of controller 803, then generate the data modulation based on the brand and DIP switch setting and generate the transmission frequency by selecting the appropriate crystal as the reference frequency.

Controller 803 may relate to one or more of a processor, microprocessor and application specific integrated circuit. Controller 803 include memory 815 configured to store one or more settings that may be programmed by a user. Memory 815 may relates to one of ROM and RAM memory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinary skilled in the art.

What is claimed is:

1. A method for operation of a universal transmitter, the transmitter being configured to include a plurality of buttons, a controller, a rotary switch, the rotary switch having a first ring divided into a first plurality of groups of electrically connected segments and a second ring divided into a second plurality of groups of electrically connected segments, a first set of terminals, each terminal of the first set of terminals being coupled to the controller and a group of electrically connected segments of the first plurality of groups of electrically connected segments of the first ring, and a second set of terminals, each terminal of the second set of terminals being coupled to the controller and a group of electrically connected segments of the second plurality of groups of electrically connected segments of the second ring, the rotary switch being positionable in any one of a plurality of rotary positions, the number of plurality of rotary positions being more than the number of the first set and the second set of terminals, the method comprising the acts of:

detecting activation of at least one button of the universal transmitter, by the controller, for a predetermined time;

identifying current rotary position of the rotary switch by:

outputting at least one set of signals to the first set of terminals of the rotary switch of the universal transmitter;

detecting output on the second set of terminals of the rotary switch;

determining the current rotary position of the rotary switch, by the controller, based, at least in part, on the output detected on the second set of terminals;

detecting activation of a first button to be programmed; and programming said first button based on a transmission type assigned to the current rotary position.

2. The method of claim 1, further comprising:

detecting activation of said first button; and generating an activation signal by the universal transmitter based on the transmission type.

3. The method of claim 2, further comprising enabling a frequency selection switch, by the controller, based on activation of said first button.

4. The method of claim 1, further comprising:

detecting a second position of the rotary switch; and programming said first button based, in part, on the second position of the rotary switch, wherein the second position relates to a transmission frequency.

5. The method of claim 4, further comprising:

detecting activation of said first button; and generating an activation signal by the universal transmitter based on the transmission type.

6. The method of claim 1, further comprising:

detecting a second position of the rotary switch;

detecting a second button to be programmed; and programming said second button based on the second position of the rotary switch.

7. The method of claim 1, further comprising detecting a DIP switch setting based on the position of the rotary switch and programming said first position button based on the DIP switch setting.

8. The method of claim 1, wherein the transmission type relates to a transmission characteristic associated with at least one of a brand of barrier operator manufacturer and transmission frequency.

9. The method of claim 1, further comprising activating an LED of the universal transmitter, by the controller, to signal a programmer to activate a button to be programmed.

10. A universal transmitter comprising:

at least one activation button configured to receive a user input;

a rotary switch, the rotary switch having a first ring divided into a first plurality of groups of electrically connected segments and a second ring divided into a second plurality of groups of electrically connected segments, a first set of terminals, each terminal of the first set of terminals being coupled to a group of electrically connected segments of the first plurality of groups of electrically connected segments of the first ring, and a second set of terminals, each terminal of the second set of terminals being coupled to a group of electrically connected segments of the second plurality of groups of electrically connected segments of the second ring, the rotary switch being positionable in any one of a plurality of rotary positions to receive a user selection, the number of plurality of rotary positions being more than the number of the first set and the second set of terminals;

a transmission circuit configured to wirelessly transmit one or more activation signals; and a controller coupled to the at least one activation button, the rotary switch and the transmission circuit, the controller configured to:

detect activation of the at least one activation button for a predetermined time;

identify current rotary position of the rotary switch by:

outputting at least one set of signals to the first set of terminals of the rotary switch;

detecting output on the second set of terminals of the rotary switch;

determining the current rotary position of the rotary switch based, at least in part, on the output detected on the second set of terminals;

detect activation of a first button to be programmed; and program said first button based on a transmission type assigned to the current rotary position.

11. The system of claim 10, wherein the controller is further configured to:

detect activation of said first button; and generate an activation signal by the universal transmitter based on the transmission type.

12. The system of claim 11, wherein the controller is further configured to enable a frequency selection switch based on activation of said first button.

13. The system of claim 10, wherein the controller is further configured to:

detect a second position of the rotary switch; and program said first button based, in part, on the second position of the rotary switch, wherein the second position relates to a transmission frequency.

14. The system of claim 13, wherein the controller is further configured to:

detect activation of said first button; and generate an activation signal based on at least one of the transmission type and transmission frequency.

15. The system of claim 10, wherein the controller is further configured to:

detect a second position of the rotary switch;

detect a second button to be programmed; and program said second button based on the second position of the rotary switch.

16. The system of claim 10, further comprising a DIP switch, wherein the controller is further configured to detect a DIP switch setting based on the position of the rotary switch and program said first position button based on the DIP switch setting.

17. The system of claim 10, wherein the transmission type relates to a transmission characteristic associated with at least one of a barrier operator manufacturer and transmission frequency.

18. The system of claim 10, further comprising an LED, wherein the controller is configured to activate the LED to signal a user to activate a button to be programmed.

19. A method for operation of a universal transmitter, the transmitter being configured to include a plurality of buttons, a controller, a rotary switch, the rotary switch having a first ring divided into a first plurality of groups of electrically connected segments and a second ring divided into a second plurality of groups of electrically connected segments, a first set of terminals, each terminal of the first set of terminals being coupled to the controller and a group of electrically connected segments of the first plurality of groups of electrically connected segments of the first ring, and a second set of terminals, each terminal of the second set of terminals being coupled to the controller and a group of electrically connected segments of the second plurality of groups of electrically connected segments of the second ring, the rotary switch being positionable in any one of a plurality of rotary positions, the number of plurality of rotary positions being more than the number of the first set and the second set of terminals, the method comprising the acts of:

detecting activation of at least one button of the universal transmitter, by the controller, for a predetermined time;

determining a first rotary position of the rotary switch of the universal transmitter, by the controller, wherein the first rotary position of the rotary switch is identified by outputting at least one set of signals to the first set of terminals of the rotary switch and detecting output on the second set of terminals of the rotary switch, and determining the first rotary position based at least in part on the output detected on the second set of terminals;

detecting activation of a first button to be programmed;

programming said first button based on a first transmission frequency assigned to the first rotary position;

determining a second rotary position of the rotary switch of the universal transmitter, by the controller, wherein the second rotary position of the rotary switch is identified by outputting at least one set of signals to the first set of terminals, detecting another output on the second set of terminals associated with the second rotary position and determining the second rotary position based at least in part on the other output detected on the second set of terminals;

detecting activation of a second button to be programmed; and programming said second button based on a second transmission frequency assigned to the second rotary position.

20. The method of claim 19, further comprising:

detecting activation of said first button; and generating an activation signal by the universal transmitter based on the first transmission frequency.

21. The method of claim 19, further comprising enabling a frequency selection switch, by the controller, based on activation of one or more of the first and second activation buttons.

22. The method of claim 19, wherein the first and second transmission frequencies relate to transmission frequencies associated with a barrier operator manufacturer.

23. The method of claim 19, further comprising activating an LED of the universal transmitter, by the controller, to signal a programmer to activate a button to be programmed.

* * * * *